United States Patent
Mantey et al.

(10) Patent No.: US 7,200,781 B2
(45) Date of Patent: Apr. 3, 2007

(54) DETECTING AND DIAGNOSING A MALFUNCTIONING HOST COUPLED TO A COMMUNICATIONS BUS

(75) Inventors: Paul John Mantey, Fort Collins, CO (US); David R. Maciorowski, Longmont, CO (US); Michael D. Young, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 628 days.

(21) Appl. No.: 10/437,981

(22) Filed: May 14, 2003

(65) Prior Publication Data

US 2004/0230878 A1 Nov. 18, 2004

(51) Int. Cl.
G06F 11/00 (2006.01)

(52) U.S. Cl. .................. 714/53; 714/10; 714/12; 714/25; 714/43; 714/48; 714/51; 710/107; 710/110

(58) Field of Classification Search .......... 714/4, 714/10–12, 23, 25, 43, 47, 48, 51, 55, 56; 710/107, 110
See application file for complete search history.

(56) References Cited

U.S. PATENT DOCUMENTS

| | | | |
|---|---|---|---|
| 3,810,120 A | 5/1974 | Huettner | |
| 4,486,829 A * | 12/1984 | Mori et al. | 714/34 |
| 4,999,838 A | 3/1991 | Horikawa | |
| 5,276,864 A | 1/1994 | Hernandez et al. | |
| 5,452,443 A | 9/1995 | Oyamada | |
| 5,513,319 A * | 4/1996 | Finch et al. | 714/55 |
| 5,530,946 A | 6/1996 | Bouvier et al. | |
| 5,729,767 A | 3/1998 | Jones et al. | |
| 5,784,547 A | 7/1998 | Dittmar | |
| 5,805,790 A | 9/1998 | Nota et al. | |
| 5,895,494 A | 4/1999 | Scalzi et al. | |
| 5,911,084 A | 6/1999 | Jones et al. | |
| 6,061,600 A | 5/2000 | Ying | |
| 6,145,036 A * | 11/2000 | Barenys et al. | 710/300 |
| 6,580,898 B1 * | 6/2003 | Oguri | 455/8 |

FOREIGN PATENT DOCUMENTS

| | | |
|---|---|---|
| EP | 0676696 A1 | 10/1995 |
| JP | 58114145 A | 7/1983 |
| JP | 02257358 A2 | 3/1989 |
| JP | 04147347 A2 | 10/1990 |
| JP | 04172537 A2 | 11/1990 |
| JP | 11015700 A2 | 6/1997 |
| WO | WO02/01347 A2 | 1/2002 |
| WO | WO02/01347 A3 | 1/2002 |

* cited by examiner

*Primary Examiner*—Robert Beausoliel
*Assistant Examiner*—Charles Ehne

(57) ABSTRACT

Techniques and apparatus are disclosed for detecting and responding to the malfunction of a host coupled to a communications bus through a bus transceiver.

50 Claims, 7 Drawing Sheets

DETECTING AND DIAGNOSING A MALFUNCTIONING HOST COUPLED TO A COMMUNICATIONS BUS

CROSS REFERENCE TO RELATED APPLICATIONS

This application is related to commonly-owned U.S. patent application Ser. No. 10/342,886, filed on Jan. 15, 2003, entitled "Systems and Methods for Accessing Bus-Mastered System Resources," which is hereby incorporated by reference.

BACKGROUND

Referring to FIG. 1, a prior art computer system 100 is shown in which three processors 102a–c communicate with each other over a communications bus 108. The processors 102a–c may, for example, be multiple processors within a single multi-processor computer, or be processors in distinct computers communicating with each other over a network. As is well-known to those of ordinary skill in the art, processors 102a–c may transmit and receive data and/or instructions over the communications bus 108 using messages encoded according to a communications protocol associated with the communications bus 108. One example of a conventional communications bus is the Inter-IC (I²C) bus.

The processors 102a–c are coupled to bus transceivers 106a–c over local buses 104a–c, respectively. To transmit a message over the communications bus 108 (also called a "system bus" to distinguish it from the local buses 104a–c), a processor queues the message at the corresponding bus transceiver. For example, for processor 102a to transmit a message over the communications bus 108 to processor 102b, processor 102a must transmit the message over local bus 104a to the corresponding bus transceiver 106a, where the message is queued. Bus transceiver 106a then negotiates for control of the communications bus 108 in accordance with the bus protocol to become a bus master, and transmits the message over the communications bus 108 to the destination bus transceiver 106b. Bus transceiver 106b forwards the message to the destination processor 102b, and the originating bus transceiver 106a indicates to the processor 102a (by transmitting an appropriate message over the local bus 104a) that the message has successfully been sent.

Problems can arise when one of the processors 102a–c, or any other device (such as a microcontroller) which communicates over the communications bus 108 through one of the transceivers 106a, malfunctions or otherwise becomes unable to communicate over the communications bus 108. In particular, if one of the processors 102a–c fails while the corresponding one of the bus transceivers 106a is the bus master and is waiting for additional data from the failed processor, the transceiver may retain control of the bus 108 indefinitely, thereby making it impossible for other processors to communicate over the bus 108. This is referred to as "hanging" the bus 108.

One technique that has been used to address this problem is to couple watchdog timers 110a–c between each of the processors 102a–c and corresponding bus transceivers 106a–c. In general, each of the watchdog timers 110a–c transmits an interrupt signal to the corresponding bus transceiver if the corresponding processor has been inactive for more than a predetermined threshold period of time. Although the watchdog timers 110a–c may be implemented in many ways, in one implementation the watchdog timers 110a–c are timers that are initialized to a zero value and which are incremented each clock cycle. Processors 102a–c periodically reset their corresponding watchdog timer to zero. The frequency at which the processors 102a–c reset the watchdog timers 110a–c is chosen so that the value of the watchdog timers 110a–c will never reach a particular predetermined threshold value if the corresponding processor is behaving normally. If the value of a particular one of the watchdog timers 110a–c reaches the predetermined threshold value, then it is likely that the corresponding processor has crashed or that the processor is otherwise malfunctioning. In the event that one of the watchdog timers 110a–c reaches the predetermined threshold value, the watchdog timer generates an interrupt signal to the corresponding bus transceiver, causing the bus transceiver to release control of the communications bus 108, and thereby preventing the bus from hanging.

This approach does not, however, eliminate all problems that may arise when one of the processors 102a–c fails. Consider an example in which processor 102a has failed. If processor 102b attempts to transmit a message to processor 102a over the communications bus 108, the message will fail to be transmitted successfully because processor 102a is in a failed state.

What is needed, therefore, are improved techniques for detecting and responding to the failure of a device coupled to a communications bus.

SUMMARY

In one aspect of the present invention, a method is provided for use in a computer system including a system bus, a first local bus, a first host, a first bus transceiver coupled to the first host over the first local bus, and a second bus transceiver coupled to the first bus transceiver over the system bus. The method includes steps of: (A) detecting a failure of the first host; (B) transmitting a first failure message over the system bus in response to detecting the failure of the first host; and (C) receiving the first failure message at the second bus transceiver.

In another aspect of the present invention, a device is provided for use in a computer system including a system bus, a first local bus, a first host, a first bus transceiver coupled to the first host over the first local bus, and a second bus transceiver coupled to the first bus transceiver over the system bus. The device includes failure detection means for detecting a failure of the first host; failure message transmission means for transmitting a first failure message over the system bus in response to detecting the failure of the first host; and failure message reception means for receiving the first failure message at the second bus transceiver.

In yet another aspect of the present invention, a device is provided for use in a computer system including a system bus, a first local bus, a first host, a first bus transceiver coupled to the first host over the first local bus, and a second bus transceiver coupled to the first bus transceiver over the system bus. The device includes a failure detector coupled to the first host and the first bus transceiver and operable to transmit a failure indication in response to detecting a failure of the first host; a failure message transmitter coupled to the failure detector and operable to transmit a first failure message over the system bus in response to receiving the failure indication; and a failure message receiver operable to receive the first failure message.

In a further aspect of the present invention, a method is provided for use in a computer system including a system bus, a first local bus, a first host, a first bus transceiver coupled to the first host over the first local bus, and a second bus transceiver coupled to the first bus transceiver over the system bus. The method includes steps of: (A) detecting a failure of the first host; (B) receiving, at the first bus transceiver, a communications initiation message from the second bus transceiver; and (C) transmitting a first failure message from the first bus transceiver to the second bus transceiver in response to receipt of the communications initiation message.

In another aspect of the present invention, a device is provided for use in a computer system including a system bus, a first local bus, a first host, a first bus transceiver coupled to the first host over the first local bus, and a second bus transceiver coupled to the first bus transceiver over the system bus. The device includes failure detection means for detecting a failure of the first host; failure indication reception means for receiving, at the first bus transceiver, a communications initiation message from the second bus transceiver; and failure message transmission means for transmitting a first failure message from the first bus transceiver to the second bus transceiver in response to receipt of the communications initiation message.

In yet a further aspect of the present invention, a device is provided for use in a computer system including a system bus, a first local bus, a first host, a first bus transceiver coupled to the first host over the first local bus, and a second bus transceiver coupled to the first bus transceiver over the system bus. The device includes: a failure detector operable to detect a failure of the first host; a failure indication receiver operable to receive, at the first bus transceiver, a communications initiation message from the second bus transceiver; and a failure message transmitter operable to transmit a first failure message from the first bus transceiver to the second bus transceiver in response to receipt of the communications initiation message.

In yet another aspect of the present invention, a method is provided for use in a computer system including a system bus, a first local bus, a first host, a first bus transceiver coupled to the first host over the first local bus, and a state access device coupled to the first local bus and the system bus. The method includes steps of: (A) detecting a failure of the first host; (B) transferring ownership of the first local bus from the first host to the state access device; and (C) reading state information over the first local bus.

In a further aspect of the present invention, a device is provided for use in a computer system including a system bus, a first local bus, a first host, a first bus transceiver coupled to the first host over the first local bus, and a state access device coupled to the first local bus and the system bus. The device includes: failure detection means for detecting a failure of the first host; first bus ownership control means for transferring ownership of the first local bus from the first host to the state access device; and state reading means for reading state information over the first local bus.

In yet a further aspect of the present invention, a device is provided for use in a computer system including a system bus, a first local bus, a first host, and a first bus transceiver coupled to the first host over the first local bus. The device includes: a failure detector operable to detect a failure of the first host; and a state access device coupled to the first local bus and the system bus, the state access device being operable to take ownership of the first local bus and to read state information over the first local bus.

Other features and advantages of various aspects and embodiments of the present invention will become apparent from the following description and from the claims.

DETAILED DESCRIPTION

Techniques are disclosed for detecting and responding to the malfunction of a host coupled to a communications bus through a first bus transceiver. The first bus transceiver may, in response to detection of the malfunction, transmit a failure message to one or more other bus transceivers indicating that the host has malfunctioned. Alternatively, for example, the first bus transceiver may respond to subsequent communications from other bus transceivers with a failure message. The other bus transceivers may suspend communication with the host and thereby avoid hanging the communications bus. A device may be coupled between the communications bus and a local bus connecting the host to the first bus transceiver. When a malfunction of the host is detected, the device may read state information from the local bus. Such state information may be used to diagnose the cause of the malfunction and/or to remedy the malfunction.

Figure 2A:
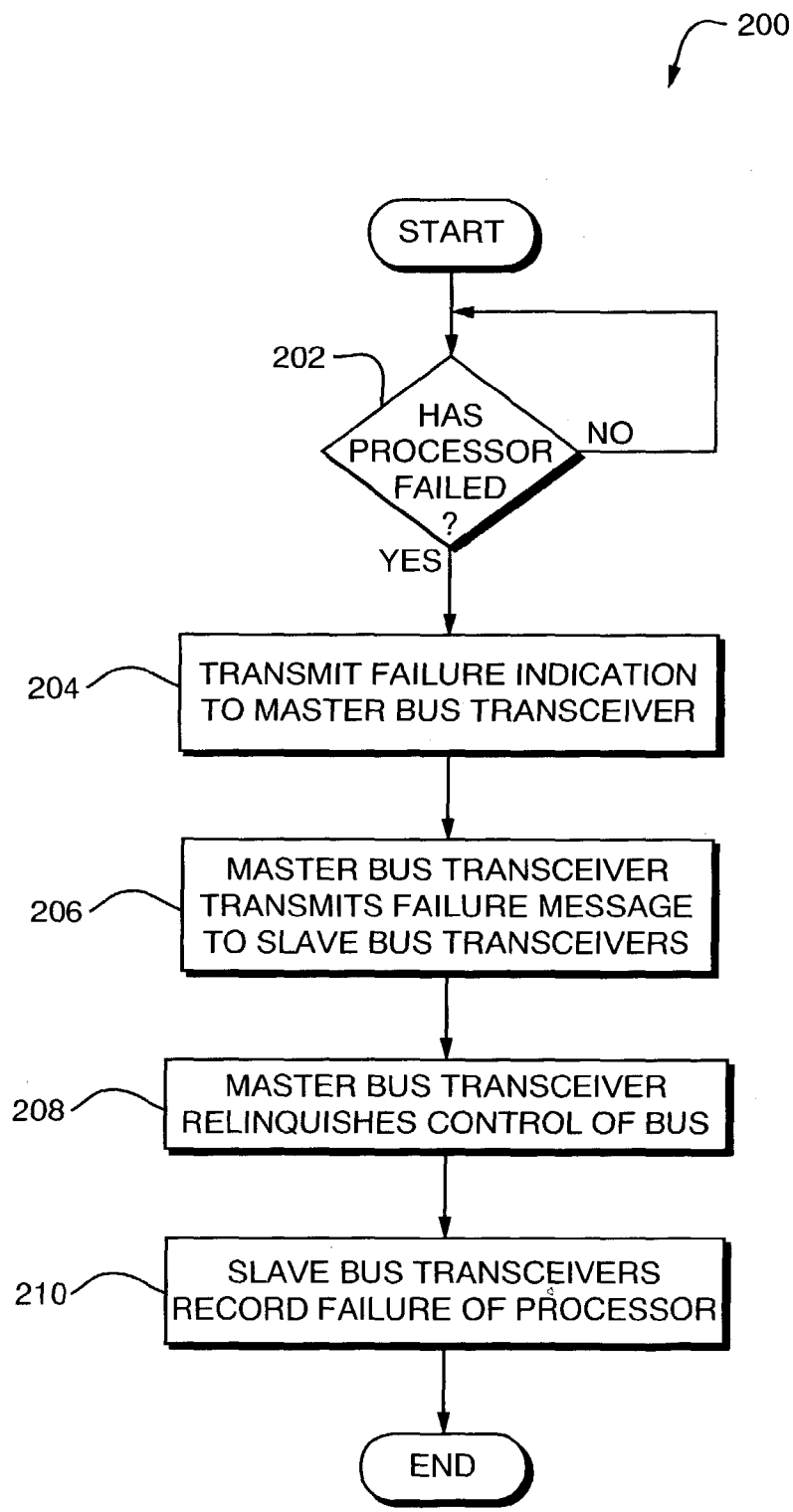
FIG. 2A is a flowchart of a method that is performed when failure of a processor coupled to a communications bus is detected according to a first embodiment of the present invention.
Figure 2B:
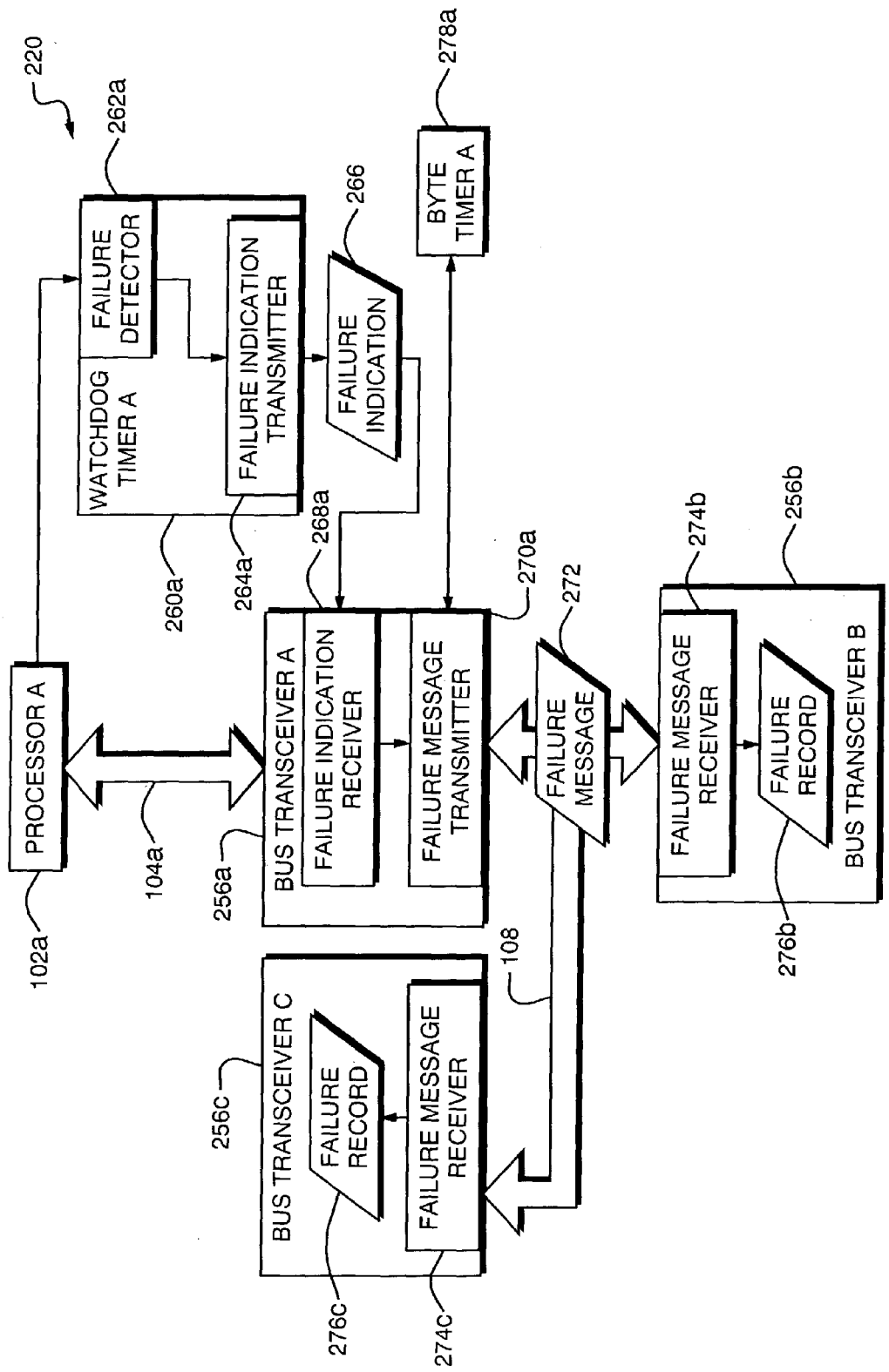
FIG. 2B is a block diagram of a system for implementing the method of FIG. 2A.

Referring to FIG. 2A, a flowchart is shown of a method 200 that is performed when failure of the processor 102a is detected according to one embodiment of the present invention. Referring to FIG. 2B, a block diagram is shown of a system 220 for implementing the method 200 of FIG. 2A.

Figure 1:
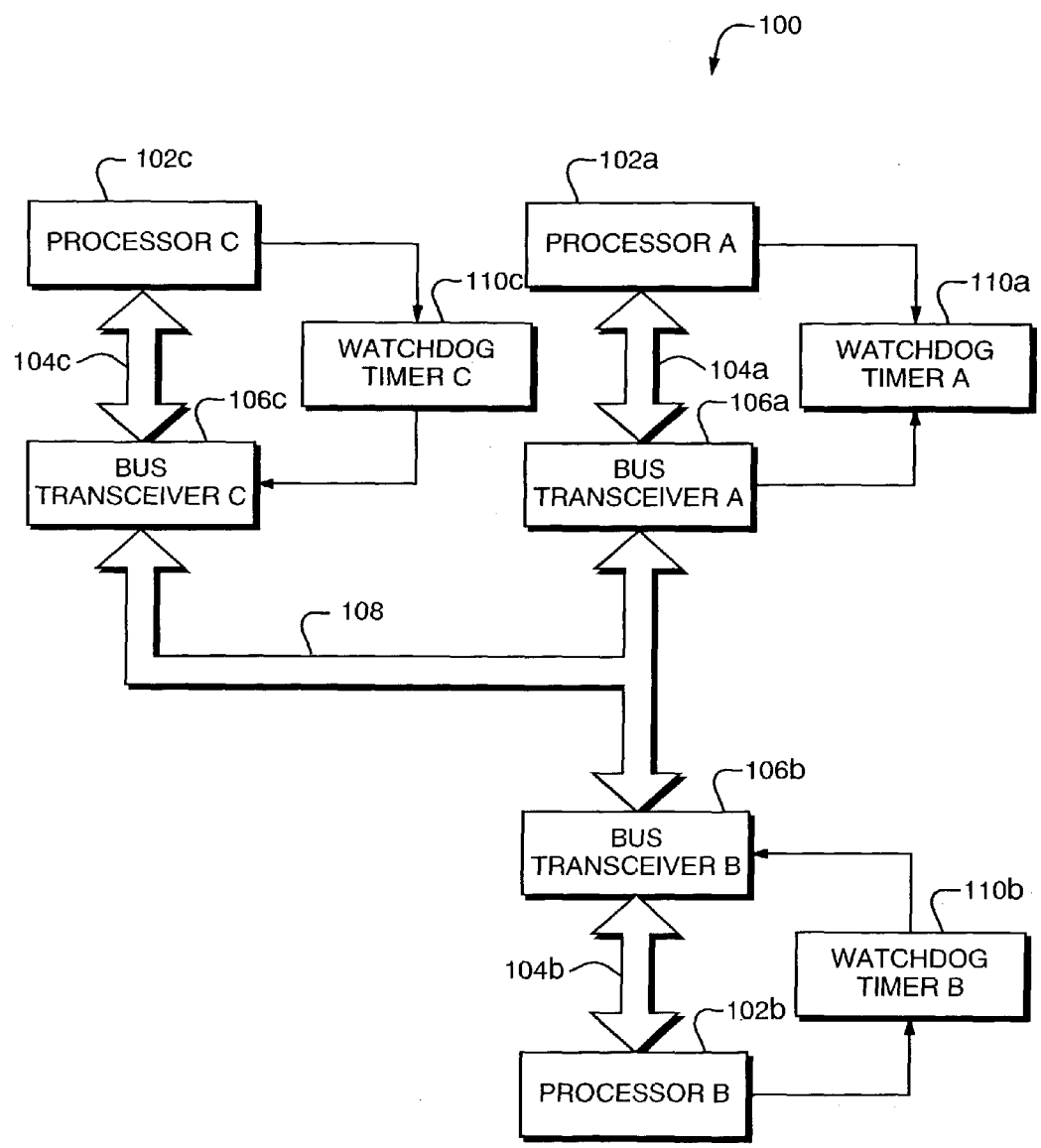
FIG. 1 is a functional block diagram of a prior art computer system including a plurality of processors communicating over a communications bus through a plurality of bus transceivers.

The system 220 is similar in certain respects to the system 100 shown in FIG. 1. For example, system 220 includes processor 102a coupled over local bus 104a to a bus transceiver 256a. Furthermore, bus transceiver 256a is coupled over communications bus 108 to bus transceivers 256b and 256c. Watchdog timer 260a is coupled between processor 102a and bus transceiver 256a. Although not shown in FIG. 2B for ease of illustration, bus transceivers 256b and 256c may also be coupled to corresponding processors and watchdog timers.

The method 200 determines whether the processor 102a has failed (step 202). For example, in the embodiment illustrated in FIG. 2B, the watchdog timer 260a includes failure detector 262a for determining whether the processor 102a has failed. The failure detector 262a may, for example, be implemented in the same manner as the conventional watchdog timer circuit described above. The method 200 repeats step 202 if the processor 102a has not failed (e.g., if the watchdog timer 260a has not reached its predetermined threshold value).

If the method 200 determines that the processor 102a has failed (step 202), the method 200 transmits a failure indication 266 to the bus transceiver 256a (step 204). For example, in the embodiment illustrated in FIG. 2B, the watchdog timer 260a includes a failure indication transmitter 264a which transmits the failure indication 266 to bus transceiver 256a, which receives the failure indication 266 at a failure indication receiver 268a. The failure indication 266 may, for example, be an interrupt or other signal designed to indicate that the processor 102a has failed.

Referring to FIG. 2B, the system 220 may also include a byte timer 278a coupled to the transceiver 256a. The system 220 may also include similar byte timers (not shown) coupled to the other transceivers 256b–c. The byte timer 278a may have a threshold value (time limit) that is significantly greater than the threshold value of the corresponding watchdog timer 260a. If the byte timer 278a reaches its threshold value, this may indicate that the watchdog timer 260a has triggered multiple times but has failed to cause the processor 102a to reset successfully. The method 200 may determine in step 202 that the processor 102a has failed when the byte timer 278a reaches its threshold value, rather than when the watchdog timer 260a reaches its threshold value. The failure detector 262a and/or failure indication transmitter 264a may be components of the byte timer 278a rather than components of the watchdog timer 260a.

In response to receiving the failure indication 266, the (master) bus transceiver 256a broadcasts a failure message 272 over the communications bus 108 to the other (slave) bus transceivers 256b–c (step 206) and relinquishes control of the bus 108 (step 208). For example, in the embodiment illustrated in FIG. 2B, the bus transceiver 256a includes a failure message transmitter 270a, which broadcasts the failure message 272 over the bus 108. The contents of the failure message 272 indicate that the processor 102a has failed and is therefore no longer available for communication over the bus 108.

The byte timer 278a may also be used to detect what state the processor 102a and/or transceiver 256a were in when the processor 102a failed. For example, the byte timer 278a may be used to determine whether the processor 102a failed while it was initializing the transceiver 256a, in which case some or all of the transceiver's registers may be uninitialized when the byte timer 278a triggers. The byte timer 278a may also be used to determine whether the processor 102a failed while attempting to either transmit or receive a message. As described in more detail below, the failure indication 266 and/or the failure message 272 may encode the nature of the failure that has been detected.

Examples of failure states that may be detected and encoded into the failure indication 266 and/or the failure message 272 include the following:

(1) Failure of the processor 102a before or during initialization of the bus transceiver 256a. The bus transceiver 256a may detect whether any or only a partial list of configuration registers have been written since reset.

(2) Failure of the processor 102a during the transmission of a message. This failure could manifest itself in at least one of two ways:

(a) Processor 102a queues a message that fits into the transceiver's send FIFO. Transceiver 256a sends the message successfully. Transceiver 256a posts an interrupt to processor 102a indicating a successful transmission. Processor 102a fails to acknowledge the interrupt. Although this does not indicate that the bus 108 is hung, future messages sent to transceiver 256a in this case would fail and cause the bus 108 to hang because the processor 102a is no longer responding to interrupts.

(b) Processor 102a queues a message that does not fit into the transceiver's send FIFO. Transceiver 256a begins sending a message and posts an interrupt to processor 102a indicating that the send FIFO is almost empty. Processor 102a fails to acknowledge the interrupt, thereby hanging the bus 108. As is well-known to those of ordinary skill in the art, the byte timer 278a may clear this state. The failure message 272 may indicate in this case which device had caused the bus 108 to hang.

(3) Processor 102a fails while the transceiver 256a is receiving a message. This failure could also manifest itself in at least two ways:

(a) Transceiver 256a receives a message which is entirely contained within the receive FIFO. Transceiver 256a posts an interrupt to host processor 102a. Host processor 102a fails to respond to the interrupt. Although this does not indicate that the bus 108 is hung, the bus 108 will hang when a device addresses transceiver 256a to send it another message. In this case the failure message 272 would prevent devices from attempting to send messages to the failed host processor 102a.

(b) Transceiver 256a receives a message which is larger than the receive FIFO. Transceiver 256a posts an interrupt to host processor 102a. Host processor 102a fails to respond to the interrupt. In this case the bus 108 will hang either immediately or during a subsequent message. As is well-known to those of ordinary skill in the art, byte timer 278a may clear the bus hang state. In this situation, failure message 272 may indicate which host had failed and provide additional information regarding the cause of the failure, if available.

In response to receiving the failure message 272, the (slave) bus transceivers 256b–c may record the fact that the processor 102a is no longer available for communication (step 210). For example, in the embodiment illustrated in FIG. 2B, bus transceivers 256b–c include failure message receivers 274b–c, respectively, for receiving the failure message 272. Furthermore, bus transceivers 256b–c include failure records 276b–c for recording the failure status of the processor 102a, as indicated by the failure message 272.

Alternatively or additionally, the bus transceivers 256b–c may forward the failure message 272 to the corresponding processors (not shown), respectively. The processors may then record the fact that the processor 102a is no longer available for communication. In either case, the bus transceivers 256b–c and/or the processors connected to them may make use of the information contained in the failure message 272 to refrain from transmitting subsequent messages to the processor 102a or otherwise relying on the processor 102a to be available for communication over the bus 108.

Although not shown in FIG. 2B, the bus transceivers 256b–c may include failure indication receivers and failure message transmitters which operate in the same manner as the failure indication receiver 268a and the failure message transmitter 270a, respectively, in the bus transceiver 256a. Similarly, although not shown in FIG. 2B, the bus transceiver 256a may include a failure message receiver and a failure record which operate in the same manner as the failure message receivers 274b–c and the failure records 276b–c, respectively.

The techniques just described may be used to reduce or eliminate the possibility that the bus 108 will hang when the processor 102a fails. By notifying the bus transceivers 256b–c and/or the processors connected to them that the processor 102a has failed, such components may refrain from attempting to communicate with the processor 102a and thereby prevent the bus transceiver 256a from gaining permanent control of the bus 108 and thereby hanging the bus 108.

Figure 3A:
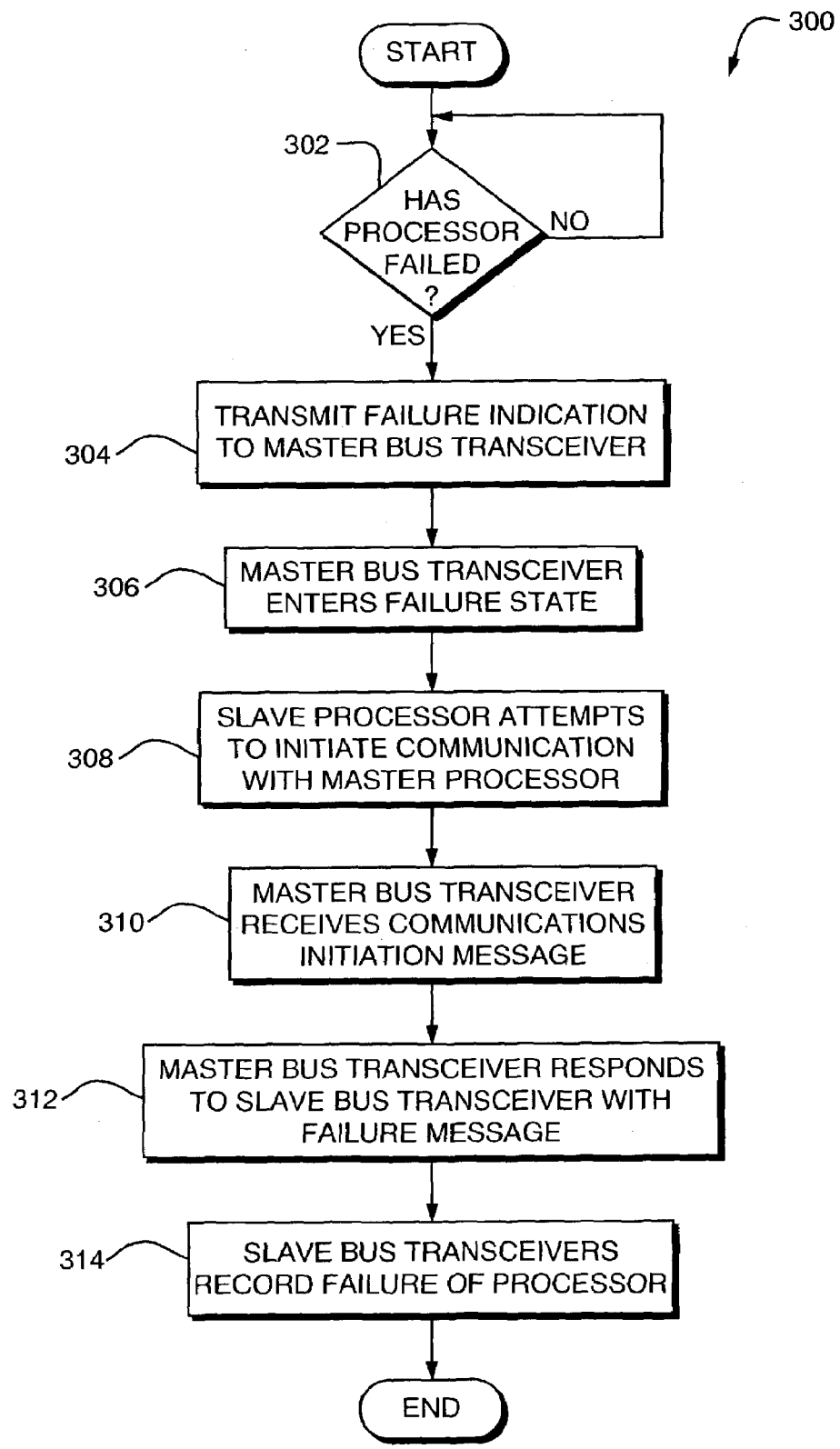
FIG. 3A is a flowchart of a method that is performed when failure of a processor coupled to a communications bus is detected according to a second embodiment of the present invention.
Figure 3B:
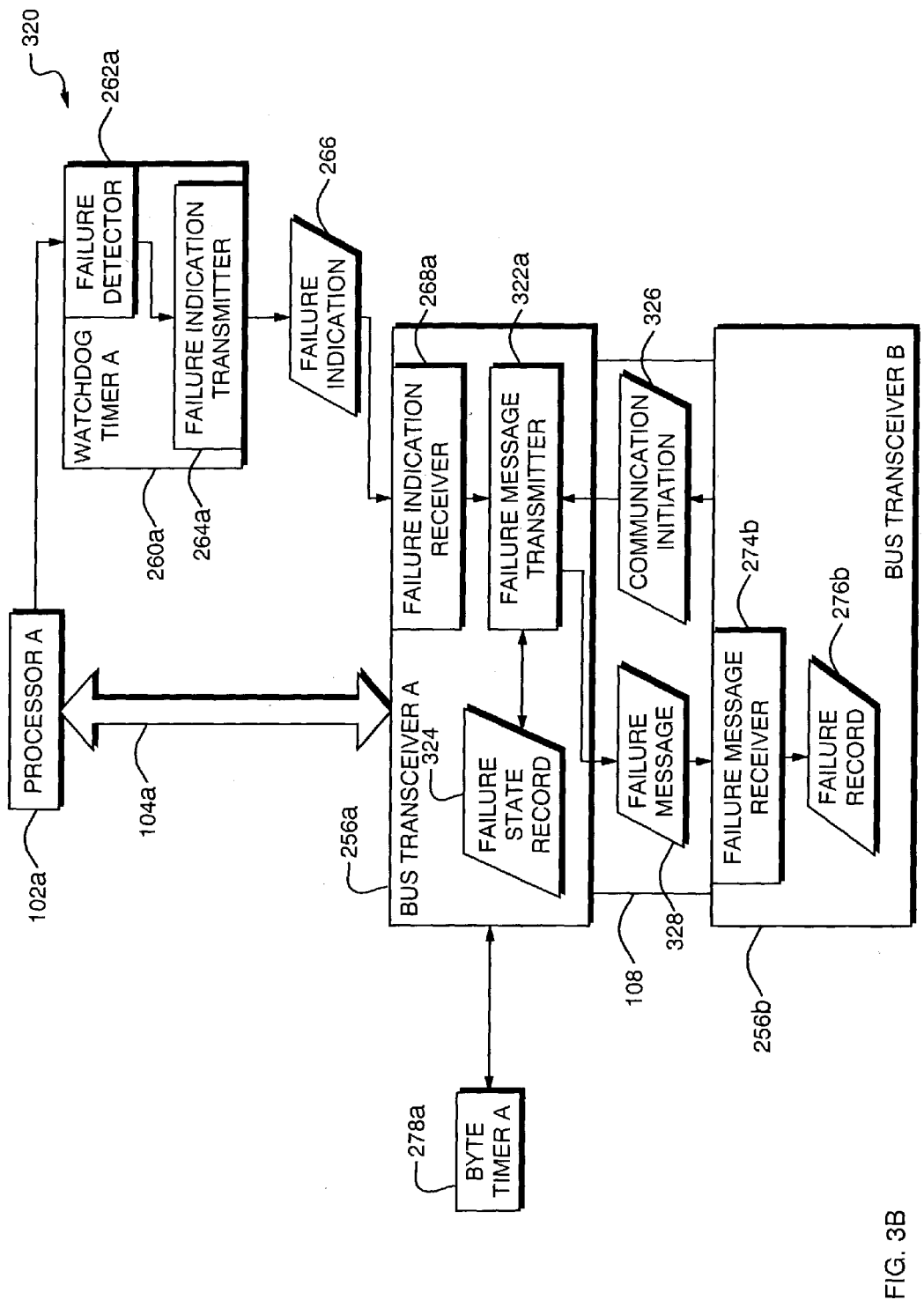
FIG. 3B is a block diagram of a system for implementing the method of FIG. 3A.

Referring to FIG. 3A, a flowchart is shown of a method 300 that is performed when failure of the processor 102a is detected according to another embodiment of the present invention. Referring to FIG. 3B, a block diagram is shown of a system 320 for implementing the method 300 of FIG. 3A.

The system 320 is similar in certain respects to the system 220 shown in FIG. 2B. For example, the system 320 includes processor 102a coupled over local bus 104a to bus transceiver 256a, and watchdog timer 260a coupled between processor 102a and bus transceiver 256a. Similarly, system 320 includes bus transceiver 256b coupled to bus transceiver 256a over bus 108. Although not shown in FIG. 3B for ease of illustration, system 320 also includes bus transceiver 256c (shown in FIG. 2B) coupled to bus transceiver 256a over bus 108.

The method 300 determines whether the processor 102a has failed (step 302). For example, in the embodiment illustrated in FIG. 3B, the watchdog timer 260a may determine whether the processor 102a has failed using the techniques described above with respect to FIG. 2B. The method 300 repeats step 302 if the processor 102a has not failed (e.g., if the watchdog timer 260a has not reached its predetermined threshold value).

If the method 300 determines that the processor 102a has failed (step 302), the method 300 transmits a failure indication 266 to the bus transceiver 256a (step 304). For example, in the embodiment illustrated in FIG. 3B, failure indication transmitter 264a transmits the failure indication 266 to bus transceiver 256a, which receives the failure indication 266 at failure indication receiver 268a.

In response to receiving the failure indication 266, the (master) bus transceiver 256a enters a state (referred to herein as a "failure state") in which it responds to messages received from other transceivers with a failure message, as will now be described (step 306). For example, in the embodiment shown in FIG. 3B, the bus transceiver 256a includes a failure message transmitter 322a and a failure state record 324. The failure state record 324 indicates whether the processor 102a is in a failed state. When the failure indication receiver 268a receives the failure indication 266 from the failure indication transmitter 264a, the failure indication receiver 268a notifies the failure message transmitter 322a of the failure. The failure message transmitter 322a, in turn, updates the failure state 324 to indicate that the processor 102a is in a failed state.

Now assume, for purposes of example, that at some point after processor 102a fails, the processor (not shown) connected to bus transceiver 256b attempts to initiate communication with processor 102a by transmitting a communications initiation message 326 through bus transceiver 256b (step 308). Processor 102a will be referred to in this example as a "master" processor because it is behind the master bus transceiver 256a, and the processor connected to bus transceiver 256b will be referred to in this example as a "slave" processor because it is behind slave bus transceiver 256b.

Master bus transceiver 256a receives the communications initiation message 326 (step 310) and, instead of forwarding the message 326 to the processor 102a, responds to slave bus transceiver 256b with failure message 328 (step 312). The contents of the failure message 328 indicate that the processor 102a has failed and is therefore no longer available for communication over the bus 108. Transceiver 256a may relinquish control of the bus 108 after transmitting the failure message 328.

For example, in the embodiment shown in FIG. 3B, the failure message transmitter 322a may receive the communications initiation message 326 and, in response, determine whether the failure state record 324 indicates that the processor 102a is in a failed state. If the failure message transmitter 322a determines that the processor 102a is not in a failed state, the bus transceiver 256a may process the communications initiation 326 normally. If, however, the failure message transmitter 322a determines that the processor 102a is in a failed state, the failure message transmitter 322a transmits the failure message 328 to the bus transceiver 256b, where it is received by the failure message receiver and processed in the manner described above with respect to FIG. 2B. For example, in response to receiving the failure message 328, the (slave) bus transceiver 256b may record the fact that the processor 102a is no longer available for communication (step 314).

Unlike the failure message 272 shown in FIG. 2B, the failure message 328 is unicast to bus transceiver 256b (rather than being broadcast over the bus 108), and the failure message 328 is transmitted in response to receipt of the communications initiation message 326 from the bus transceiver 256b (rather than being transmitted in response to detection that the processor 102a has failed).

It should be appreciated that the techniques just described with respect to FIGS. 3A–3B may be used to reduce or eliminate the possibility that the bus 108 will hang when the processor 102a fails, for reasons that are similar to those described above with respect to FIGS. 2A–2B. Furthermore, it should be appreciated that the techniques described above with respect to FIGS. 2A–2B may be combined with the those described above with respect to FIGS. 3A–3B in various ways. For example, the bus transceiver 256a may wait until it receives a communications initiation message from one of the other bus transceivers 256b–c before broadcasting the failure message 272 on the bus 108.

Figure 4A:
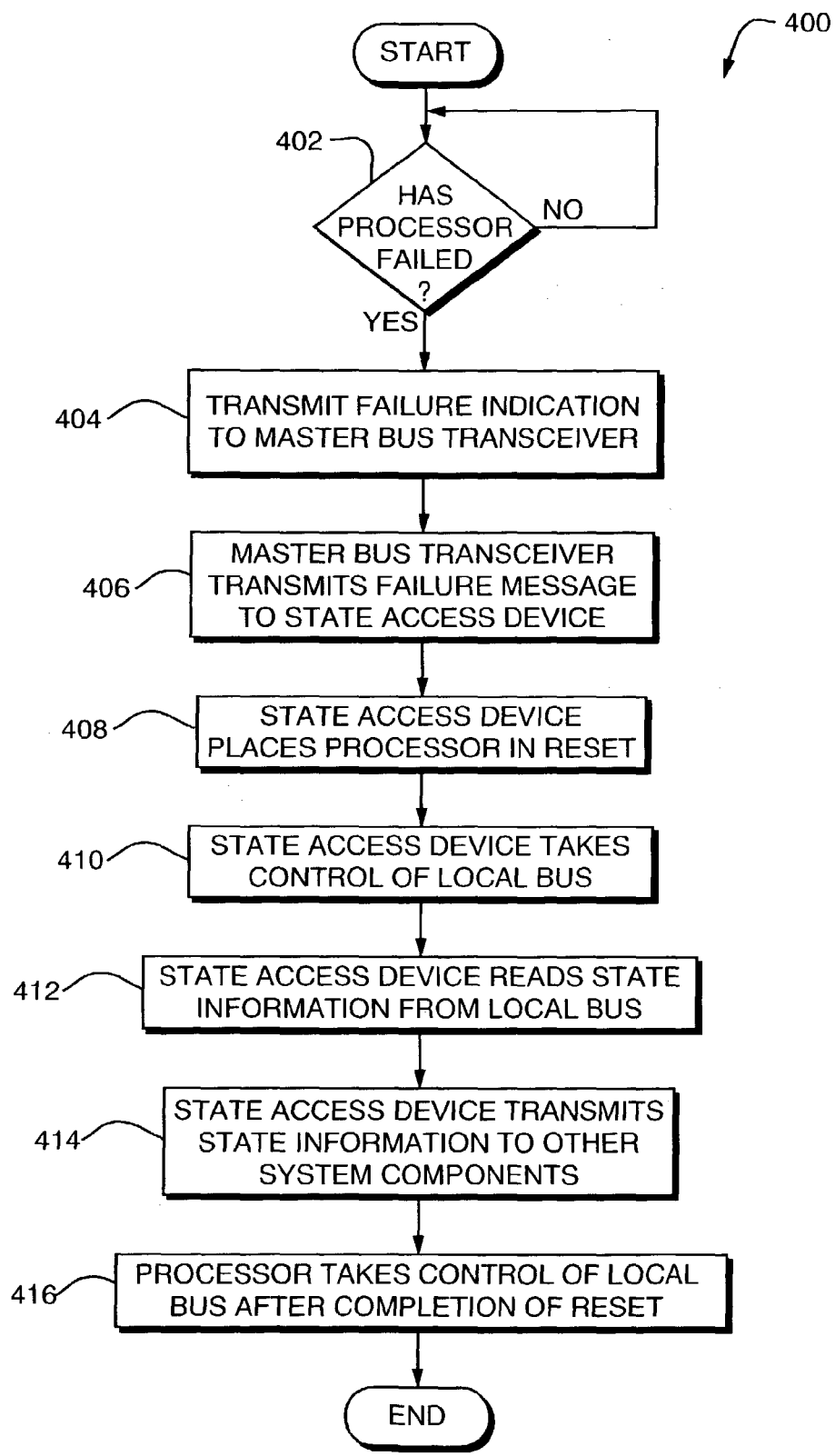
FIG. 4A is a flowchart of a method that is performed when failure of a processor is detected according to a third embodiment of the present invention.
Figure 4B:
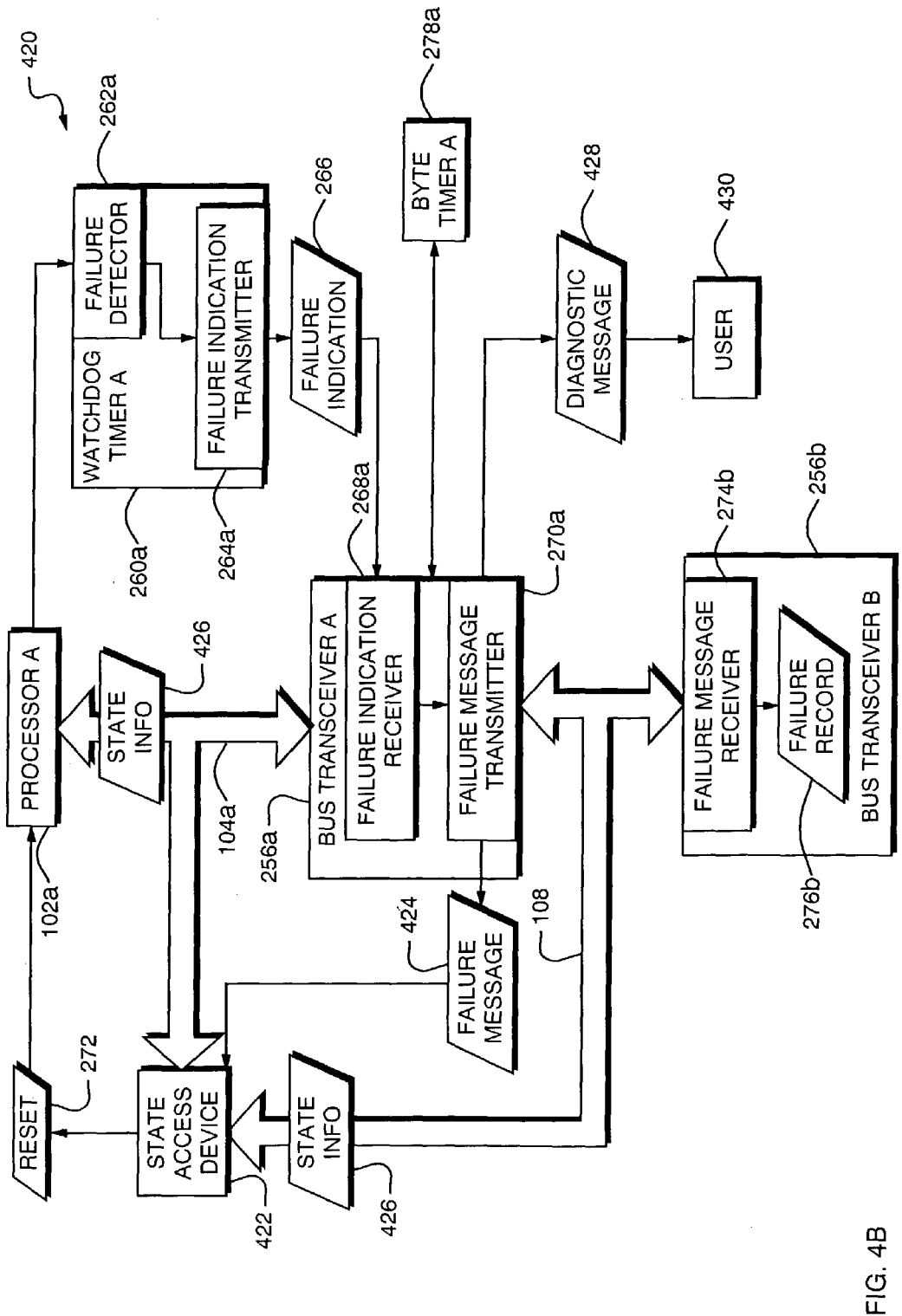
FIG. 4B is a block diagram of a system for implementing the method of FIG. 4A.

Referring to FIG. 4A, a flowchart is shown of a method 400 that is performed when failure of the processor 102a is detected according to another embodiment of the present invention. Referring to FIG. 4B, a block diagram is shown of a system 420 for implementing the method 400 of FIG. 4A.

The system 420 is similar in certain respects to the system 220 shown in FIG. 2B. For example, the system 420 includes processor 102a coupled over local bus 104a to bus transceiver 256a, and watchdog timer 260a coupled between processor 102a and bus transceiver 256a. Similarly, system 420 includes bus transceiver 256b coupled to bus transceiver 256a over bus 108. Although not shown in FIG. 4B for ease of illustration, system 420 also includes bus transceiver 256c (shown in FIG. 2B) coupled to bus transceiver 256a over bus 108.

In addition to the elements of the system 220 shown in FIG. 2B, the system 420 shown in FIG. 4B includes a state access device 422 which is coupled both to the local bus 104a and the system bus 108. The state access device 422 will be described in more detail below.

The method 400 determines whether the processor 102a has failed (step 402). For example, in the embodiment illustrated in FIG. 4B, the watchdog timer 260a may determine whether the processor 102a has failed using the techniques described above with respect to FIG. 2B. The method 400 repeats step 402 if the processor 102a has not failed (e.g., if the watchdog timer 260a has not reached its predetermined threshold value).

If the method 400 determines that the processor 102a has failed (step 402), the method 400 transmits a failure indication 266 to the bus transceiver 256a (step 404). For example, in the embodiment illustrated in FIG. 4B, failure indication transmitter 264a transmits the failure indication 266 to bus transceiver 256a, which receives the failure indication 266 at failure indication receiver 268a.

In response to receiving the failure indication 266, the (master) bus transceiver 256a transmits a failure message 424 to the state access device 422 (step 406). The bus transceiver 256a may, for example, transmit the failure message 424 to the state access device 422 over the local bus 104a, the system bus 108, or using other means.

In response to receiving the failure message 424, the state access device 422 places the processor 102a in reset in an attempt to restore the functionality of the processor 102a (step 408). The state access device 422 takes control of the local bus 104a, which was previously controlled by the processor 102a (step 410). Techniques that may be used to enable the state access device 422 to take control of the local bus 104a are disclosed in more detail in the above-referenced patent application entitled "Systems and Methods for Accessing Bus-Mastered System Resources."

The state access device 422 reads state information 426 from the local bus 104a (step 412). The state information 426 may include, for example, the contents of the local registers of the processor 102a, memory of the processor 102a (such as Flash RAM or SRAM), or state registers that are external to the processor 102a and available on the local bus 104a. Although the availability of such state information may be limited depending on the state of the processor 102a before it malfunctioned and the particular architecture of the system 420, the state access device 422 may attempt to read as much state information as is available.

The state access device 422 transmits the state information 426 to one or more other components of the system 420 (step 414). For example, the state access device 422 may transmit the state information 426 over the system bus 108 to one or more of the bus transceivers 256b, which may forward the state information 426 to one or more of the processors 102b–c.

The components that receive the state information 426 may attempt to use it to diagnose the problem that caused the processor 102a to malfunction and/or to revive the processor 102a so that it returns from a failed state to a normal operational state. For example, one of the processors 102b–c may determine, based on an analysis of the state information 426, that the processor 102a had been in the process of communicating with a Dual Universal Asynchronous Receiver/Transmitter (DUART) at the time that the processor 102a malfunctioned.

Whether or not the cause of the malfunction is determined, the state information 426 may be used in attempt to return processor 102a from a failed state to a normal operating state. For example, one of the processors 102b–c may determine, based on an analysis of the state information 426, that the processor 102a includes firmware that is not up-to-date. In such a case, one of the processors 102b–c may attempt to update the firmware of the processor 102a (e.g., by transmitting the firmware update to the processor through the state access device 422 or bus transceiver 256a). Resetting the processor 102a after installing such a firmware update may be sufficient to return the processor 102a to a normal operating state.

Once the processor 102a has completed its reset and returned to a normal operating state, the processor 102a may retake control of the local bus 104a from the state access device 422. The processor 102a may then resume normal communication over the local bus 104a and over the system bus 108 through the bus transceiver 256a.

It should be appreciated that the techniques just described with respect to FIGS. 4A–4B may be used to reduce or eliminate the possibility that the bus 108 will hang when the processor 102a fails, for reasons that are similar to those described above with respect to FIGS. 2A–2B and FIGS. 3A–3B. Furthermore, it should be appreciated that the techniques described above with respect to FIGS. 4A–4B may be combined with the those described above with respect to FIGS. 2A–2B and FIGS. 3A–3B in various ways. For example, the bus transceiver 256a may incorporate a failure state record (such as the failure state record 324 shown in FIG. 3) to maintain a record of the state of processor 102a and thereby prevent other components on the bus 108 from attempting to communicate with processor 102a while it is in a failed state or in reset.

One advantage of some embodiments of the present invention is that they may be used to prevent a communications bus from hanging when a host coupled to the communications bus crashes or otherwise becomes unable to communicate over the bus. For example, techniques disclosed above enable a host malfunction to be detected so that steps may be taken to ensure that the malfunctioning host does not retain control of the bus and thereby prevent other devices from communicating over the bus. The malfunctioning host may be reset, repaired, or replaced while other devices continue to communicate over the bus.

A related advantage of some embodiments of the present invention is that devices connected to a communications bus may be notified that a host coupled to the bus has malfunctioned. As a result of such notification, devices connected to the bus may avoid attempting to communicate with the malfunctioning host. Such notification may therefore result in an increase in overall bus performance by eliminating or reducing cycles wasted in attempting to address the malfunctioning host over the bus.

Another advantage of some embodiments of the present invention is that a user of the computer system may be notified that a host has malfunctioned. For example, referring again to FIG. 4B, the failure message transmitter 270a (or other appropriate component of the system 420) may generate and transmit a diagnostic message 428 to a user 430 of the system 420 in response to receiving the failure indication 266. Such a message may indicate in any way, such as by displaying a window or text message on a computer monitor, that the processor 102a has malfunctioned. The diagnostic message 428 may both notify the user 430 that the processor 102a has malfunctioned and provide the user 430 with information about the nature of the malfunction. For example, the diagnostic message 428 may inform the user 430 that the processor 102a is failing to initialize even though the watchdog timer 260a is triggering, and may inform the user 430 of the amount of time that the watchdog timer 260a has been triggering. The diagnostic message 428 may also include some or all of the state information 426.

The ability to provide a diagnostic message to the user is advantageous, for example, because it enables the user to take actions, such as replacing the processor 102a, which it may not be possible for the system 420 to perform automatically. Alternatively, for example, the user may perform other diagnostics on the system 220 which may enable the user to diagnose the source of the malfunction.

More generally, the techniques disclosed herein are beneficial because they make available the state information 426, which is typically unavailable when a host fails behind a bus transceiver. Such information may be used by other components of the system 420, such as the processors 102b–c, in an attempt to diagnose and/or fix the problem that caused the processor 102a to malfunction. In previous systems, it was typically necessary to physically remove a malfunctioning device from the system and replace it with a new device.

It is to be understood that although the invention has been described above in terms of particular embodiments, the foregoing embodiments are provided as illustrative only, and do not limit or define the scope of the invention. Various other embodiments, including but not limited to the following, are also within the scope of the claims.

Elements and components described herein may be further divided into additional components or joined together to form fewer components for performing the same functions. For example, the bus transceiver 256a and the state access device 422 (FIG. 4B) may be combined into a single device for performing the same functions. Furthermore, although particular numbers of certain components (such as processors 102a–c and bus transceivers 256a–c) are shown and described herein, the particular numbers of components are illustrative and do not constitute limitations of the present invention. For example, the techniques disclosed herein may be implemented in conjunction with a greater or lesser number of processors and bus transceivers than shown and described herein.

Although it was stated above that the bus 108 may be implemented as an I²C bus, this is not a requirement of the present invention. Rather, the bus 108 may be any kind of bus. For example, the bus 108 may be a Universal Serial Bus (USB) or an Ethernet bus.

Although watchdog timers are used in the description above as examples of devices that may be used to detect the failure of the processor 102a, devices other than watchdog timers may be used to perform the function of malfunction detection. In particular, malfunction detection need not be based merely on the amount of time in which a processor has failed to respond, but rather may be based on other factors.

Although the examples above involve processors 102a–c coupled to bus 108 through bus transceivers 256a–c, respectively, the techniques disclosed herein may be applied to devices other than processors. More generally, the term "host" is used herein to refer to any device that may communicate over a bus through a bus transceiver.

Although the description herein may refer to the "failure" of a processor, the term "failure" is used broadly herein to refer to any malfunction which makes a processor (or other host) substantially unable to communicate over the communications bus 108. A host may, therefore, experience a failure and yet continue to function to some degree. A processor failure may have any of a variety of causes, such as fetching and attempting to execute an illegal instruction or entering an interrupt service routine and failing to exit that routine.

The description above refers to the failure indication 266 and to various failure messages 272, 328, and 424. These signals may be designed and implemented in any manner to indicate that the processor 102a has failed and, optionally, to provide information related to the failure. Furthermore, different failure indications/messages may be transmitted for different reasons. In particular, a failure message may encode a description of the kind of failure that has occurred. For example, one failure indication/message may be used to indicate that the processor 102a has not recovered from a watchdog timer reset, while a different failure indication/message may be used to indicate that the watchdog timer itself is failing to transmit a reset signal to the processor 102a for some reason.

Although references are made herein to certain devices taking control of a bus by becoming a "bus master," the techniques disclosed herein are not limited to use in conjunction with bus architectures in which certain devices may be designated as "master devices" and others as "slave devices." Rather, those of ordinary skill in the art will appreciate how to implement the techniques disclosed herein in conjunction with other kinds of bus architectures. References herein to taking "control" or "ownership" of a bus include, but are not limited to, cases in which a device takes such control or ownership by becoming a bus master.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or Field-Programmable Gate Arrays (FPGAs). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. In a computer system including a system bus, a first local bus, a first host processor, a first bus transceiver coupled to the first host processor over the first local bus, and a second bus transceiver coupled to the first bus transceiver over the system bus, a method comprising steps of:
   (A) at the first bus transceiver, identifying a failure of the first host processor;
   (B) at the first bus transceiver, transmitting a first failure message over the system bus in response to detecting the failure of the first host processor; and
   (C) receiving the first failure message at the second bus transceiver.

2. The method of claim 1, wherein the step (A) comprises a step of determining that the first host processor has failed to reset a watchdog timer for more than a predetermined threshold period of time.

3. The method of claim 1, wherein the step (A) comprises a step of determining that the first bus transceiver has failed to reset a byte timer for more than a predetermined threshold period of time.

4. The method of claim 1, wherein the step (B) comprises a step of broadcasting the first failure message over the system bus.

5. The method of claim 1, wherein the step (B) comprises a step of unicasting the first failure message over the system bus to the second bus transceiver.

6. The method of claim 1, further comprising a step of:
   (D) recording, at the second bus transceiver, the failure of the first host processor.

7. The method of claim 1, wherein the system further comprises a second local bus and a second host processor coupled to the second bus transceiver over the second local bus, and wherein the method further comprises a step of:
   (D) transmitting a second failure message to the second host processor over the second local bus in response to receipt of the first failure message.

8. The method of claim 7, further comprising a step of:
   (E) recording, at the second host processor, the failure of the first host processor.

9. The method of claim 1, further comprising a step of:
   (D) releasing ownership of the system bus by the first bus transceiver.

10. The method of claim 1, further comprising a step of:
    (D) suspending communication from the second bus transceiver to the first bus transceiver in response to receipt of the first failure message at the second bus transceiver.

11. The method of claim 10, further comprising a step of:
    (E) resuming communication from the second bus transceiver to the first bus transceiver after the first host processor leaves the failure state.

12. The method of claim 11, further comprising a step of:
    (F) prior to step (E), resetting the first host processor; and
    wherein step (E) comprises a step of resuming communication from the second bus transceiver to the first bus transceiver after completion of step (F).

13. The method of claim 1, further comprising a step of:
    (D) transmitting to a user of the computer system a message indicating the failure of the first host processor.

14. In a computer system including a system bus, a first local bus, a first host processor, a first bus transceiver coupled to the first host processor over the first local bus, and a second bus transceiver coupled to the first bus transceiver over the system bus, a device comprising:
    failure identification means in the first bus transceiver for identifying a failure of the first host processor;
    failure message transmission means in the first bus transceiver for transmitting a first failure message over the system bus in response to detecting the failure of the first host processor; and
    failure message reception means for receiving the first failure message at the second bus transceiver.

15. The device of claim 14, further comprising:
    failure recording means for recording the failure of the first host processor.

16. The device of claim 14, further comprising:
    means for releasing ownership of the system bus by the first bus transceiver.

17. The device of claim 14, further comprising:
    diagnostic message transmission means for transmitting to a user of the computer system a message indicating the failure of the first host processor.

18. In a computer system including a system bus, a first local bus, a first host processor, a first bus transceiver coupled to the first host processor over the first local bus, and a second bus transceiver coupled to the first bus transceiver over the system bus, a device comprising:
    a failure detector coupled to the first host processor and the first bus transceiver and operable to transmit a failure indication to the first bus transceiver, over a connection distinct from the system bus, in response to detecting a failure of the first host processor;
    a failure message transmitter coupled to the failure detector and operable to transmit a first failure message over the system bus in response to receiving the failure indication; and
    a failure message receiver operable to receive the first failure message.

19. The device of claim 18, wherein the failure detector comprises a watchdog timer.

20. The device of claim 18, wherein the failure detector comprises a byte timer.

21. The device of claim 18, wherein the second bus transceiver further comprises a failure record to record the failure of the first host processor.

22. The device of claim 18, further comprising a diagnostic message transmitter operable to transmit to a user of the computer system a message indicating the failure of the first host processor.

23. In a computer system including a system bus, a first local bus, a first host processor, a first bus transceiver coupled to the first host processor over the first local bus, and a second bus transceiver coupled to the first bus transceiVer over the system bus, a method comprising steps of:
    (A) at the first bus transceiver, identifying a failure of the first host processor;
    (B) receiving, at the first bus transceiver, a communications initiation message from the second bus transceiver; and
    (C) transmitting a first failure message from the first bus transceiver to the second bus transceiver in response to receipt of the communications initiation message.

24. The method of claim 23, wherein the step (A) comprises a step of determining that the first host processor has failed to reset a watchdog timer for more than a predetermined threshold period of time.

25. The method of claim 23, wherein the step (A) comprises a step of determining that the first bus transceiver has failed to reset a byte timer for more than a predetermined threshold period of time.

26. The method of claim 23, further comprising a step of:
(D) at the first bus transceiver, entering a failure state in response to detecting the failure of the first host processor; and
wherein the step (C) comprises steps of:
(C)(1) determining whether the first bus transceiver is in the failure state;
(C)(2) transmitting the first failure message from the first bus transceiver to the second bus transceiver if it is determined that the first bus transceiver is in the failure state; and
(C)(3) transmitting the communications initiation message to the first host processor if it is determined that the first bus transceiver is not in the failure state.

27. The method of claim 23, further comprising a step of:
(E) recording, at the second bus transceiver, the failure of the first host processor.

28. The method of claim 23, wherein the system further comprises a second local bus and a second host processor coupled to the second bus transceiver over the second local bus, and wherein the method further comprises a step of:
(D) transmitting a second failure message to the second host processor over the second local bus in response to receipt of the first failure message.

29. The method of claim 28, further comprising a step of:
(E) recording, at the second host processor, the failure of the first host processor.

30. The method of claim 23, further comprising a step of:
(E) suspending communication from the second bus transceiver to the first bus transceiver in response to receipt of the first failure message at the second bus transceiver.

31. The method of claim 30, further comprising a step of:
(F) resuming communication from the second bus transceiver to the first bus transceiver after the first host processor leaves the failure state.

32. The method of claim 31, further comprising a step of:
(F) prior to step (E), resetting the first host processor; and
wherein step (E) comprises a step of resuming communication from the second bus transceiver to the first bus transceiver after completion of step (F).

33. The method of claim 23, further comprising a step of:
(D) transmitting to a user of the computer system a message indicating the failure of the first host processor.

34. In a computer system including a system bus, a first local bus, a first host processor1 a first bus transceiver coupled to the first host processor over the first local bus, and a second bus transceiver coupled to the first bus transceiver over the system bus, a device comprising:
failure identification means in the first btis transceiver for identifying a failure of the first host processor;
failure indication reception means for receiving, at the first bus transceiver, a communications initiation message from the second bus transceiver; and
failure message transmission means for transmitting a first failure message from the first bus transceiver to the second bus transceiver in response to receipt of the communications initiation message.

35. The device of claim 34, further comprising:
failure recording means for recording the failure of the first host processor.

36. The device of claim 34, further comprising:
diagnostic message transmission means for transmitting to a user of the computer system a message indicating the failure of the first host processor.

37. In a computer system including a system bus, a first local bus, a first host processor, a first bus transceiver coupled to the first host over the first local bus, and a second bus transceiver coupled to the first bus transceiver over the system bus, a device comprising:
a failure detector coupled to the first host processor and the first bus transceiver and operable to transmit a failure indication to the first bus transceiver, over a connection distinct from the system bus, in response to detecting a failure of the first host processor;
a failure indication receiver operable to receive, at the first bus transceiver, a communications initiation message from the second bus transceiver; and
a failure message transmitter operable to transmit a first failure message from the first bus transceiver to the second bus transceiver in response to receipt of the communications initiation message.

38. The device of claim 37, further comprising:
failure recording means for recording the failure of the first host processor.

39. The device of claim 37, further comprising:
a diagnostic message transmitter operable to transmit to a user of the computer system a message indicating the failure of the first host processor.

40. In a computer system including a system bus, a first local bus, a first host processor, a first bus transceiver coupled to the first host processor over the first local bus, and a state access device coupled to the first local bus arid the system bus, a method comprising steps of:
(A) detecting a failure of the first host processor;
(B) transferring ownership of the first local bus from the first host processor to the state access device; and
(C) reading state information over the first local bus.

41. The method of claim 40, wherein the step (A) comprises steps of:
(A)(1) at the first bus transceiver, detecting the failure of the first host processor; and
(A)(2) transmitting a failure message from the first bus transceiver to the state access device in response to detecting the failure of the first host processor.

42. The method of claim 40, further comprising a step of:
(D) resetting the first host processor in response to detecting the failure of the first host processor.

43. The method of claim 42, further comprising a step of:
(E) transferring ownership of the first local bus from the state access device to the first host processor after completion of step (D).

44. The method of claim 40, further comprising a step of:
(D) transmitting the state information over the system bus to the second bus transceiver.

45. In a computer system including a system bus, a first local bus, a first host processor, a first bus transceiver coupled to the first host processor over the first local bus, and a state access device coupled to the first local bus and the system bus, a device comprising:
failure detection means for detecting a failure of the first host processor;
first bus ownership control means for transferring ownership of the first local bus from the first host processor to the state access device; and state reading means for reading state information over the first local bus.

46. The device of claim 45, further comprising:

reset means for resetting the first host processor in response to detecting the failure of the first host processor.

47. The device of claim 46, further comprising:

second bus ownership control means for transferring ownership of the first local bus from the state access device to the first host processor after the first host processor has been reset.

48. The device of claim 45, further comprising:

state information transmission means for transmitting the state information over the system bus to the second bus transceiver.

49. In a computer system including a system bus, a first local bus, a first host processor, and a first bus transceiver coupled to the first host processor over the first local bus, a device comprising:

a failure detector operable to detect a failure of the first host processor; and a state access device coupled to the first local bus and the system bus, the state access device being operable to take ownership of the first local bus and to read state information over the first local bus.

50. The device of claim 49, wherein the state access device comprises reset means to reset the first host processor in response to detecting the failure of the first host processor.

* * * * *

UNITED STATES PATENT AND TRADEMARK OFFICE
CERTIFICATE OF CORRECTION

PATENT NO. : 7,200,781 B2 Page 1 of 1
APPLICATION NO. : 10/437981
DATED : April 3, 2007
INVENTOR(S) : Paul John Mantey et al.

It is certified that error appears in the above-identified patent and that said Letters Patent is hereby corrected as shown below:

In column 14, line 58, in Claim 23, delete "transceiVer" and insert -- transceiver --, therefor.

In column 15, line 55, in Claim 34, delete "processor1" and insert -- processor, --, therefor.

In column 15, line 59, in Claim 34, delete "btis" and insert -- bus --, therefor.

In column 16, line 35, in Claim 40, delete "arid" and insert -- and --, therefor.

Signed and Sealed this

Twenty-sixth Day of August, 2008

JON W. DUDAS
*Director of the United States Patent and Trademark Office*